United States Patent
Lee

(10) Patent No.: US 11,882,957 B2
(45) Date of Patent: Jan. 30, 2024

(54) COFFEE TAMPER

(71) Applicant: Zae Woo Lee, Daejeon (KR)

(72) Inventor: Zae Woo Lee, Daejeon (KR)

(*) Notice: Subject to any disclaimer, the term of this patent is extended or adjusted under 35 U.S.C. 154(b) by 640 days.

(21) Appl. No.: 16/973,712

(22) PCT Filed: Oct. 2, 2019

(86) PCT No.: PCT/KR2019/012937
§ 371 (c)(1),
(2) Date: Dec. 9, 2020

(87) PCT Pub. No.: WO2020/071799
PCT Pub. Date: Apr. 9, 2020

(65) Prior Publication Data
US 2021/0244231 A1    Aug. 12, 2021

(30) Foreign Application Priority Data
Oct. 3, 2018   (KR) .................... 10-2018-0117911

(51) Int. Cl.
*A47J 31/06* (2006.01)
(52) U.S. Cl.
CPC ............................... *A47J 31/0663* (2013.01)
(58) Field of Classification Search
CPC .... A47J 31/0663; A47J 31/44; A47J 31/3671; A47J 31/00
USPC .......................................................... 99/295
See application file for complete search history.

(56) References Cited

U.S. PATENT DOCUMENTS

| | | | |
|---|---|---|---|
| 5,526,733 A * | 6/1996 | Klawuhn | A47J 31/3671 99/287 |
| 7,325,491 B2 * | 2/2008 | Petiziol | F16F 3/02 100/219 |
| 7,992,486 B2 * | 8/2011 | Constantine | A47J 31/44 99/275 |
| 8,479,638 B2 | 7/2013 | Leung et al. | |
| 10,595,667 B2 * | 3/2020 | Southern | A47J 31/3671 |
| 10,661,520 B2 * | 5/2020 | Cui | B30B 15/0029 |
| 2004/0206243 A1 | 10/2004 | Foster et al. | |
| 2007/0132164 A1 * | 6/2007 | Petiziol | A47J 31/44 267/133 |

(Continued)

FOREIGN PATENT DOCUMENTS

DE    202016008589 U1 *   8/2018
KR    10-2013-0037893 A   4/2013

(Continued)

*Primary Examiner* — Omar Flores Sanchez
(74) *Attorney, Agent, or Firm* — Bridgeway IP Law Group, PLLC; Sang Ho Lee; Hyun Woo Shin

(57) ABSTRACT

Provided is a coffee tamper. The coffee tamper of the disclosure includes a tamper body including a connecting hole communicated in a vertical direction, a guide portion provided in the tamper body and including an inner through-hole communicated to the connecting hole, a central connecting portion of which one side is stopped by the guide portion and of which another side penetrates the inner through-hole and extends downward, a tamping portion provided below the tamper body and configured to couple with the central connecting portion, and a compressing portion provided between the guide portion and the tamping portion and configured to downwardly compress the tamping portion.

10 Claims, 7 Drawing Sheets

(56) References Cited

U.S. PATENT DOCUMENTS

2018/0055274 A1\* 3/2018 Landau ............... A47J 31/0663
2023/0165398 A1\* 6/2023 Kurnianto ............... A47J 31/44
99/287

FOREIGN PATENT DOCUMENTS

| KR | 10-2017-0043553 A | 4/2017 |
| KR | 10-1756121 B1 | 7/2017 |
| KR | 10-1964564 B1 | 4/2019 |
| WO | 2017/118545 A1 | 7/2017 |
| WO | WO-2017118545 A1 \* | 7/2017 |

\* cited by examiner

COFFEE TAMPER

TECHNICAL FIELD

The present disclosure relates to a coffee tamper, and more particularly, to a coffee tamper that may guide the tamped flat to be maintained level at all times when an operator tamps coffee grounds filled in a porter filter and may compress the coffee grounds at the uniform pressure at all times.

RELATED ART

In general, a coffee tamper is a device configured to evenly tamp coffee grounds inserted in a porter filter before extracting espresso coffee. Espresso is extracted through the porter filter and the coffee tamper.

Describing a coffee brewing process, espresso is extracted by filling an appropriate amount of brewed coffee grounds in a basket of a porter filter and then tamping the coffee grounds with a coffee tamper and by mounting the porter filter to a coffee machine.

Here, an action of compressing the coffee grounds filled in the basket of the porter filter from top to bottom with the coffee tamper to evenly tamp the coffee grounds filled in the basket of the porter filter is called tamping. Such tamping usually determines the taste and aroma of coffee. Here, it is most important whether the tamped flat is leveled. Unless the tamped flat is leveled, the hot water injected into the porter filter moves only in a specific direction, which may lead to extracting unbalanced coffee. For example, espresso with a strong bitter taste may be extracted since an excessive extraction occurs in an area where the slope is lowered due to un-leveling.

Also, to constantly control a permeation rate and a diffusion rate at which the hot water supplied in a process of extracting espresso is absorbed and spread into coffee grounds, it is important to apply a uniform and appropriate pressure in a tamping process. For example, if a too great pressure is applied for tamping, a fill factor of coffee grounds filled in the porter filter may become excessively high, which may lead to making the permeation of the hot water difficult and degrading the coffee extraction efficiency.

However, it is difficult for ordinary users, not experienced baristas, to verify a level state at the time of tamping and to level the tamped flat since the ordinary users do not master necessary movements. Also, due to inexperienced work, such as difficult to adjust a force or to compress the coffee grounds by turning the tamper from side to side, a pressure deviation occurs and coffee with an optimal taste and aroma may not be readily extracted. Also, even an experienced barista may not have the same volume and weight of coffee grounds in the porter filter at all times and may not readily verify the level at a precise level and perform tamping at an optimal pressure to match a condition of coffee grounds at all times. Therefore, it is difficult to extract coffee with the optimized taste and aroma at all times. Accordingly, there is a need to improve this.

The related art of the present disclosure is described in Korean Patent Laid-Open Publication NO. 2017-0043553 (published on Apr. 21, 2017, titled "improved coffee tamper with step design").

DETAILED DESCRIPTION

Object

The present disclosure is conceived to solve the aforementioned issues, and provides a coffee tamper that may uniformly extract coffee by guiding the tamped flat to be leveled at all times when an operator tamps coffee grounds filled in a porter filter and by constantly controlling a permeation rate and a diffusion rate of water injected into the porter filter.

The present disclosure also provides a coffee tamper that may maintain the taste of extracted coffee to be uniform by compressing coffee grounds filled in a porter filter at the uniform pressure although there is a slight difference in coffee content and by constantly controlling a fill factor of coffee grounds filled in the porter filler.

Solution

A coffee tamper according to the present disclosure includes a tamper body including a connecting hole communicated in a vertical direction, a guide portion provided in the tamper body and including an inner through-hole communicated to the connecting hole, a central connecting portion of which one side is stopped by the guide portion and of which another side penetrates the inner through-hole and extends downward, a tamping portion provided below the tamper body and configured to couple with the central connecting portion, and a compressing portion provided between the guide portion and the tamping portion and configured to downwardly compress the tamping portion.

Also, the tamper body may include a body housing including the connecting hole at the center and including an inner groove portion configured to stop the guide portion, and an extending body configured to extend from the body housing and to face the side of the tamping portion.

Also, the guide portion may include an upper guide configured to confine an upper movement of the body housing by being stopped by the inner groove portion and including the inner through-hole at the center, and a lower guide configured to extend downward from the upper guide and in which the central connecting portion and the compressing portion are provided.

Also, the central connecting portion may include a head member configured to be stopped by the upper guide, and a moving member configured to extend from the head member and extend along the inner side of the lower guide and to couple with the tamping portion.

Also, the tamping portion may include a tamping body configured to couple with the moving member, to vertically move with the moving member, and to compress coffee grounds filled in a porter filter; and a protruding body configured to extend upward from the tamping body and provided in the extending body.

Also, the compressing portion may be a spring of which one side is in contact with the guide portion and of which another side is in contact with the tamping portion.

Effect

A coffee tamper according to the present disclosure, since compressing of coffee grounds starts through a tamping portion elastically compressed by a compressing portion and compressing of coffee grounds ends when a tamper body is in contact with an edge member provided on a head portion, may uniformly extract coffee by guiding the tamped flat to be leveled at all times when an operator tamps coffee grounds filled in a porter filter and by constantly controlling a permeation rate and a diffusion rate of water injected into the porter filter, and to maintain the taste of extracted coffee to be uniform by compressing coffee grounds filled in a porter filter at the uniform pressure although there is a slight difference in coffee content and by constantly controlling a fill factor of coffee grounds filled in the porter filter.

MODE

Figure 1:
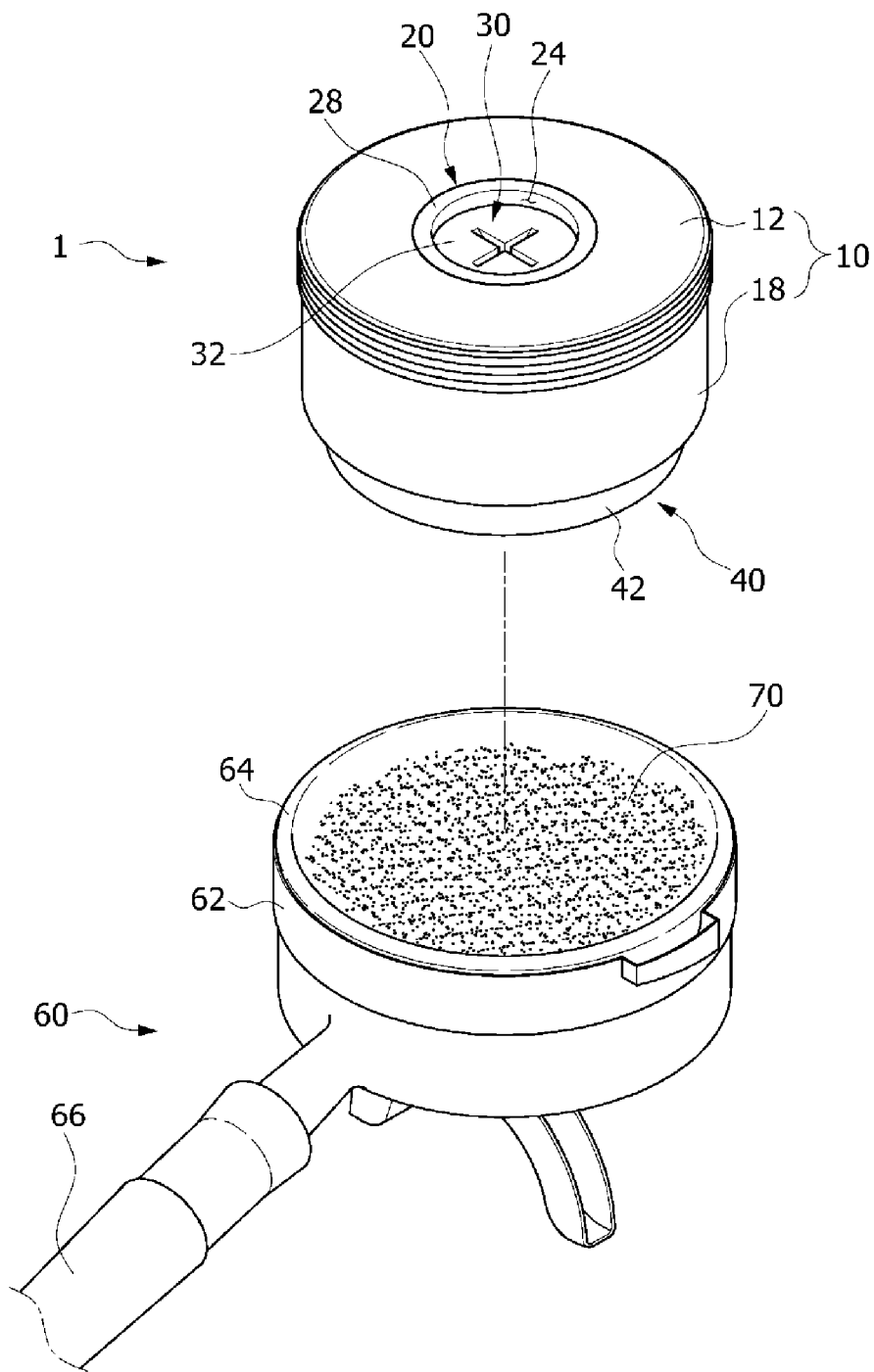
FIG. 1 is a perspective view illustrating a state in which a coffee tamper according to an embodiment of the present disclosure is provided above a porter filter.

Hereinafter, a coffee tamper according to an embodiment of the present disclosure is described with reference to the accompanying drawings. Here, thicknesses of lines or sizes of components, etc., illustrated in the drawings may be exaggerated for clarity and convenience of description.

Also, the terms used herein refer to terms defined based on functions herein. The definition of the terms may vary based on a user, the intent of an operator, or custom. Therefore, the terms need to be defined based on the overall description of the present specification.

Figure 2:
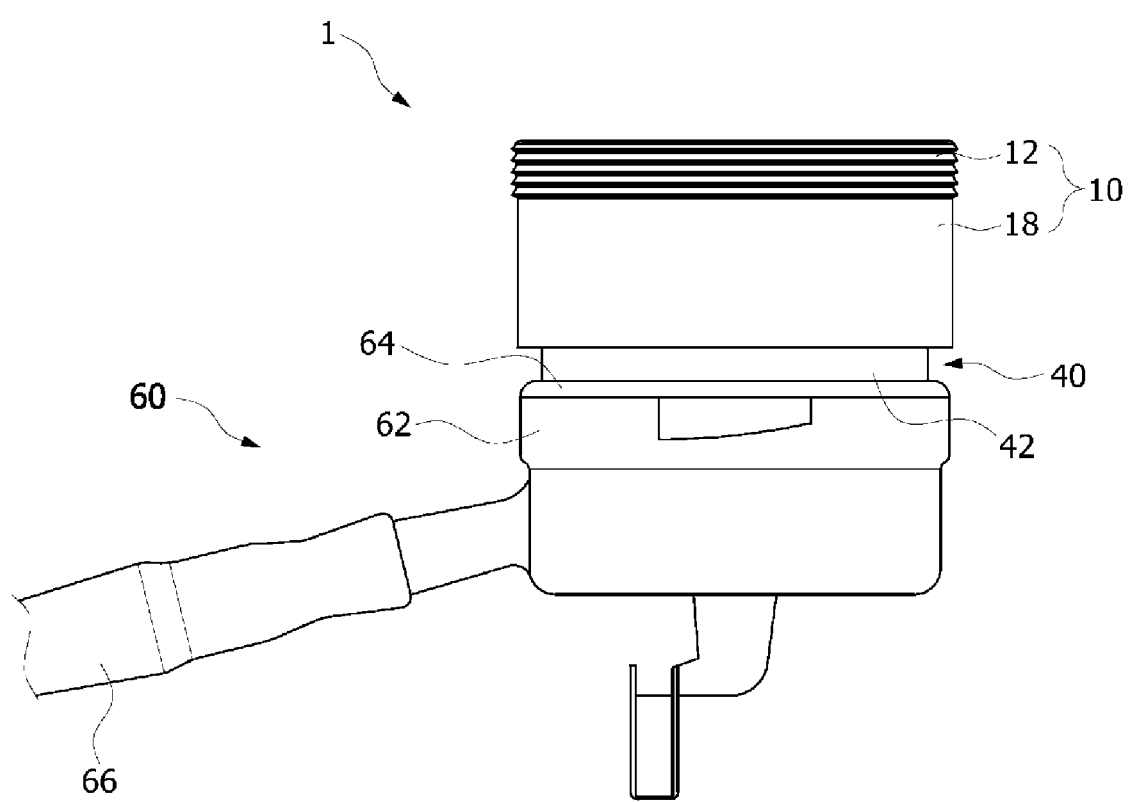
FIG. 2 is a front view illustrating a state in which a coffee tamper according to an embodiment of the present disclosure is coupled with a porter filter.
Figure 3:
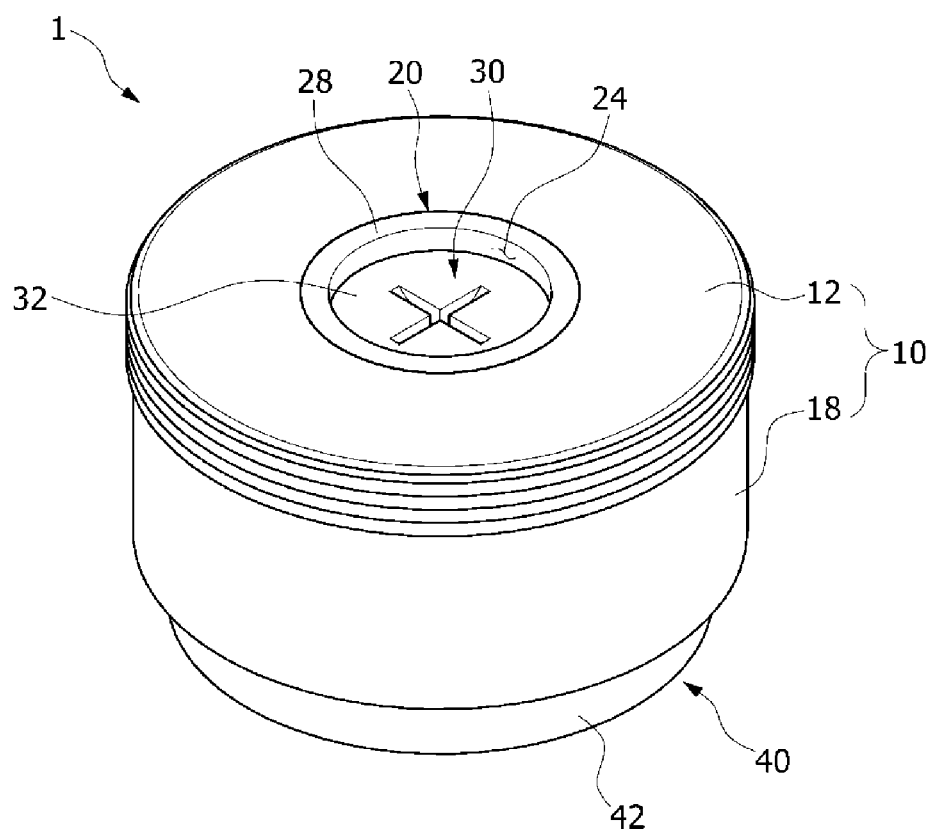
FIG. 3 is a perspective view illustrating a coffee tamper according to an embodiment of the present disclosure.
Figure 4:
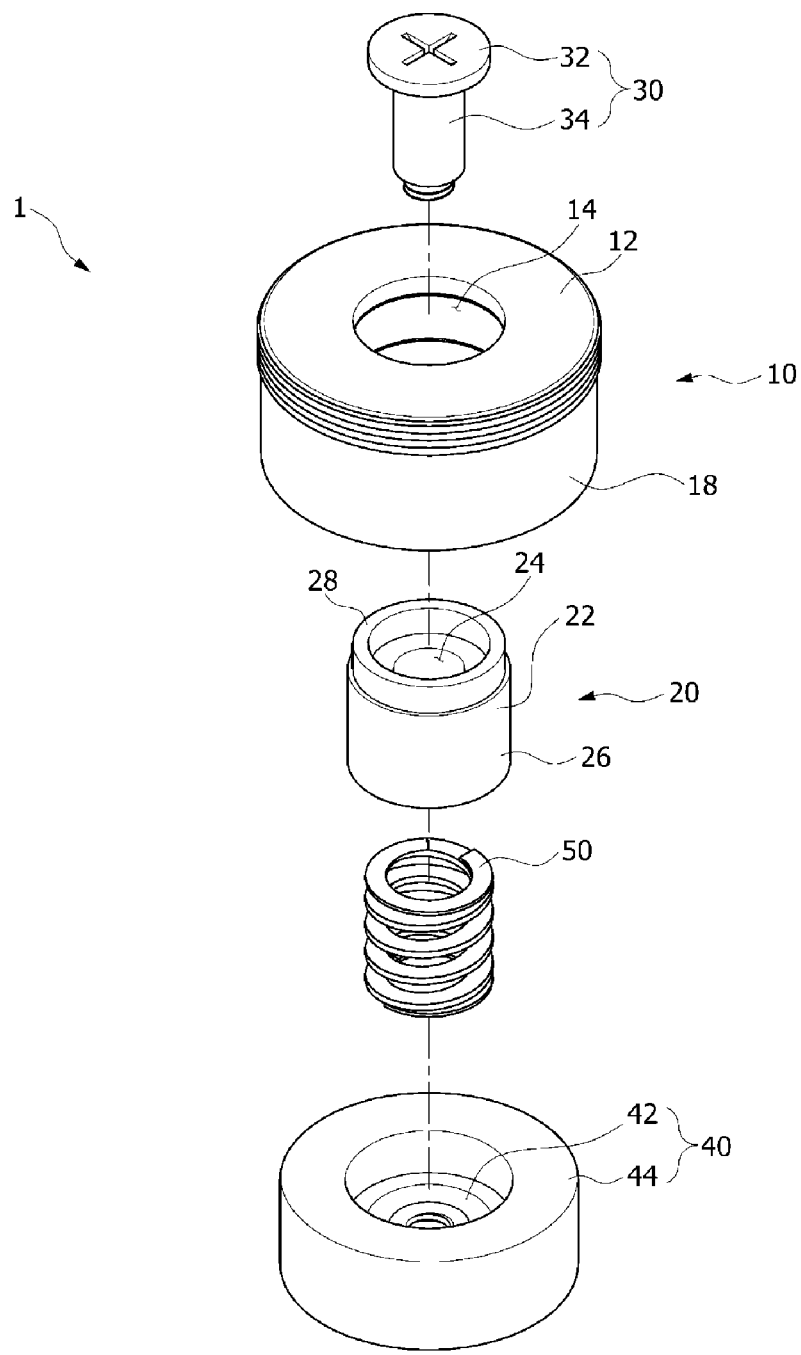
FIG. 4 is an exploded perspective view illustrating a coffee tamper according to an embodiment of the present disclosure.
Figure 5:
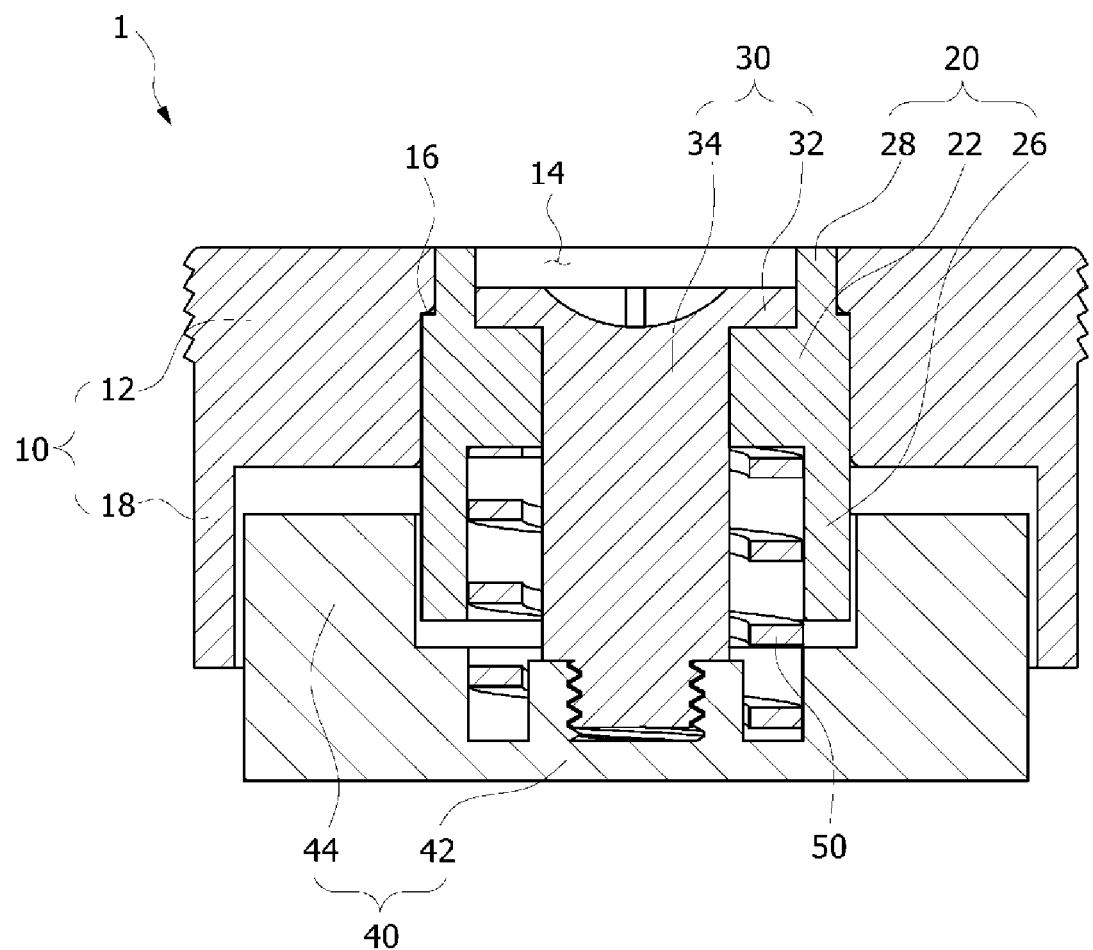
FIG. 5 is a cross-sectional view of a coffee tamper according to an embodiment of the present disclosure.
Figure 6:
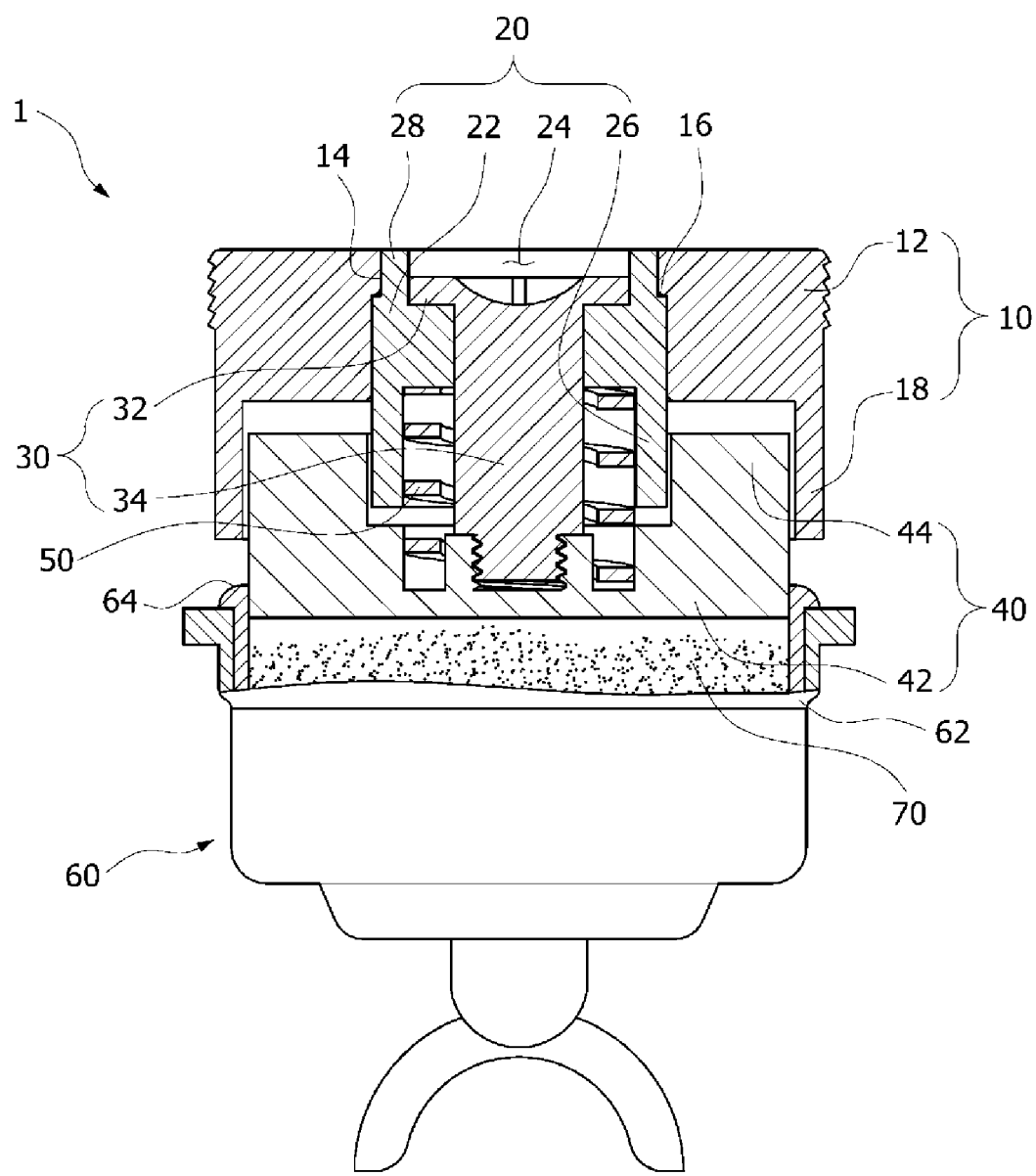
FIG. 6 is a cross-sectional view illustrating a state in which a coffee tamper according to an embodiment of the present disclosure inserts into a head portion.
Figure 7:
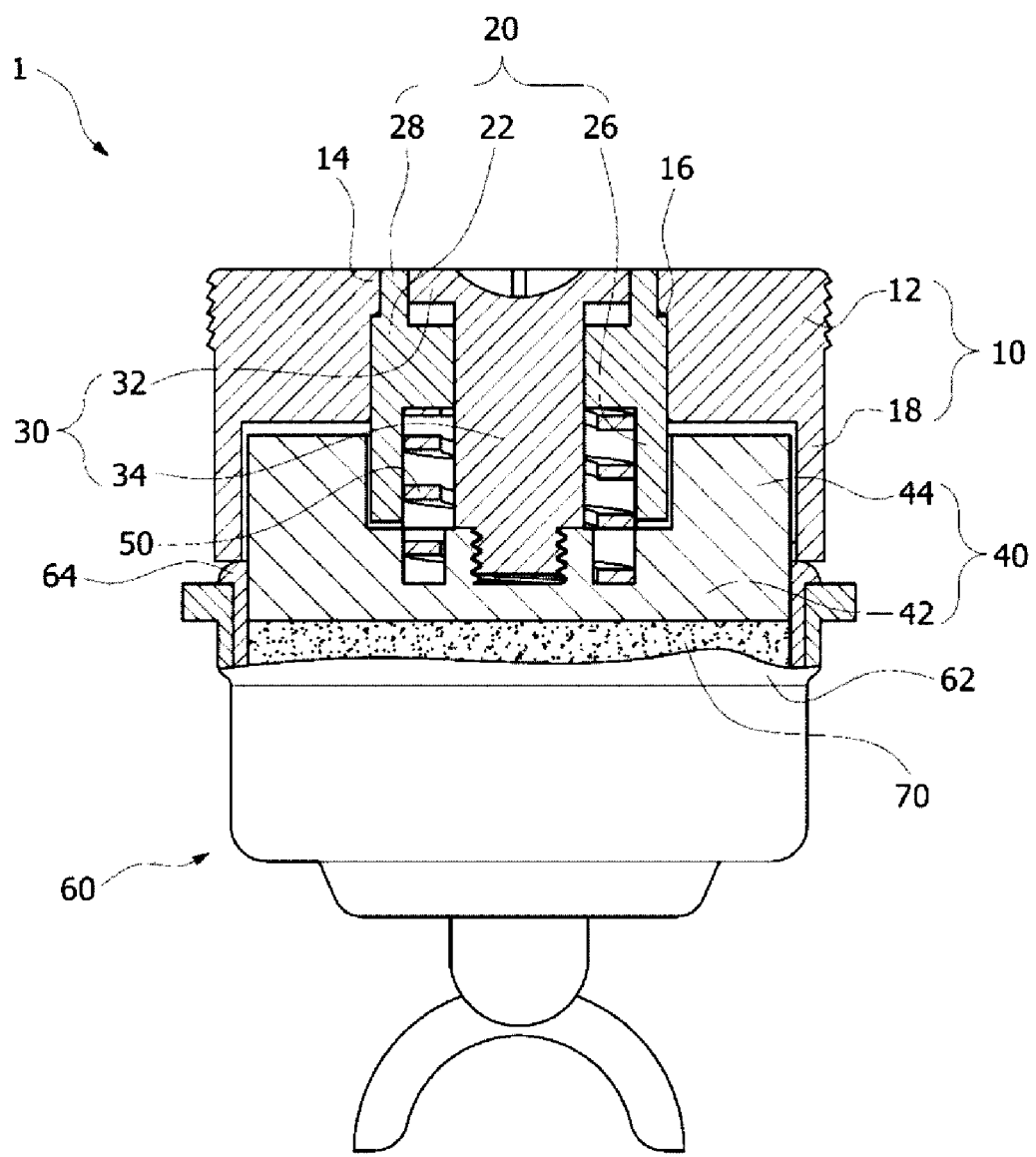
FIG. 7 is a cross-sectional view illustrating a state in which a lower movement is confined in response to a tamping body being in contact with an edge member of a head portion according to an embodiment of the present disclosure.

FIG. 1 is a perspective view illustrating a state in which a coffee tamper according to an embodiment of the present disclosure is provided above a porter filter, FIG. 2 is a front view illustrating a state in which a coffee tamper according to an embodiment of the present disclosure is coupled with a porter filter, FIG. 3 is a perspective view illustrating a coffee tamper according to an embodiment of the present disclosure, FIG. 4 is an exploded perspective view illustrating a coffee tamper according to an embodiment of the present disclosure, FIG. 5 is a cross-sectional view of a coffee tamper according to an embodiment of the present disclosure, FIG. 6 is a cross-sectional view illustrating a state in which a coffee tamper according to an embodiment of the present disclosure inserts into a head portion, and FIG. 7 is a cross-sectional view illustrating a state in which a lower movement is confined in response to a tamping body being in contact with an edge member of a head portion according to an embodiment of the present disclosure.

Referring to FIGS. 1 to 7, a coffee tamper 1 according to an embodiment of the present disclosure includes a tamper body 10 including a connecting hole 14 communicated in a vertical direction, a guide portion 20 provided in the tamper body 10 and including an inner through-hole 24 communicated to the connecting hole 14, a central connecting portion 30 of which one side is stopped by the guide portion 20 and of which another side penetrates the inner through-hole 24 and extends downward, a tamping portion 40 provided below the tamper body 10 and configured to couple with the central connecting portion 30, and a compressing portion 50 provided between the guide portion 20 and the tamping portion 40 and configured to downwardly compress the tamping portion 40.

The tamper body 10 includes the connecting hole 14 communicated in the vertical direction and is formed in various shapes within the technical spirit of being gripped by a hand of a user. The tamper body 10 according to an embodiment is in a cylindrical shape with a concave groove on the lower side and includes the connecting hole 14 vertically formed at the center. The tamper body 10 includes a body housing 12 and an extending body 18.

The body housing 12 includes the connecting hole 14 at the center, and includes an inner groove portion 16 configured to stop the guide portion 20. The connecting hole 14 is provided at the center of the body housing 12 in the cylindrical shape, and the inner groove portion 16 forming a step is provided on the inner side of the body housing 12 that faces the connecting hole 14. Therefore, since the guide portion 20 upwardly compressed by the compressing portion 50 is stopped by the inner groove portion 16 of the body housing 12, the guide portion 20 is prevented from being displayed above the body housing 12.

The extending body 18 is in a shape of a pipe that extends downward from the body housing 12 and faces the side of the tamping portion 40. A vertical movement of the tamping portion 40 is stably guided along the extending body 18. The inner diameter of the extending body 18 is greater than the outer diameter of the tamping portion 40, and a lower end of the extending body 18 is in contact with an edge member 64 provided on a head portion 62 of a porter filter 60.

The guide portion 20 is provided in the tamper body 10 and may be in various shapes without departing from the technical spirit of including the inner through-hole 24 communicated to the connecting hole 14. The guide portion 20 according to an embodiment includes an upper guide 22, a lower guide 26, and an extending protrusion 28.

The upper guide 22 is stopped by the inner groove portion 16 of the tamper body 10 to thereby confine an upper movement of the body housing 12, and the inner through-hole 24 is provided at the center. Since edge provided on the top of the upper guide 22 formed in a cylindrical shape is stopped by the inner groove portion 16 that forms a step on the inner side of the body housing 12, the upper movement of the guide portion 20 is confined.

Meanwhile, the side surface of the guide portion 20 that faces the tamper body 10 may be fastened using adhesives. The tamper body 10 and the guide portion 20 may be fastened by forming threads on the tamper body 10 and the guide portion 20, respectively, and by applying thread coupling, or may be fastened by coupling separate bolt members. Since the guide portion 20 fastens to the tamper body 10, the tamper body 10 and the guide portion 20 move together.

The round tube-shaped extending protrusion 28 that extends upward from the upper guide 22 is provided in the body housing 12. The lower guide 26 extends downward from the upper guide 22 and is in a shape of a round tube in which the central connecting portion 30 and the compressing portion 50 are provided.

One side of the central connecting portion 30 is stopped by the guide portion 20 and another side thereof penetrates the inner through-hole 24 extends downward. The central connecting portion 30 according to an embodiment includes a head member 32 and a moving member 34.

The head member 32 is in a plate shape that extends in a horizontal direction and is stopped by the top of the upper guide 22, and is formed such that the outer diameter of the head member 32 is greater than the diameter of the inner through-hole 24 and less than the inner diameter of the extending protrusion 28.

The moving member 34 extends from the head member 32 and extends along the inner side of the lower guide 26 and couples with the tamping portion 40. The moving member 34 is in a cylindrical shape and includes a thread for coupling with the tamping portion 40 on the bottom of the moving member 34. A vertical length of the moving member 34 is less than a length from the top of the upper guide 22 to the bottom of a tamping body 42.

The tamping portion 40 is provided below the tamper body 10 and couples with the central connecting portion 30 and vertically moves together with the central connecting portion 30. The tamping portion 40 according to an embodiment includes the tamping body 42 and a protruding body 44.

The tamping body 42 couples with the moving member 34, vertically moves together with the moving member 34, and compresses coffee grounds 70 filled in the porter filter 60. The bottom of the tamping body 42 is in a plate shape and evenly compresses the coffee grounds 70.

Also, the pipe-shaped protruding body 44 that extends upward from the tamping body 42 is provided in the extending body 18. Therefore, the tamping portion 40 vertically moves along the extending body 18 in response to an operation of compressing the coffee grounds 70.

The top of the protruding body 44 and the bottom of the body housing 12 are separated at a preset interval, and a distance between the protruding body 44 and the body housing 12 decreases in response to an operation of compressing the coffee grounds 70.

The compressing portion 50 is provided between the guide portion 20 and the tamping portion 40 and uses various types of elastic substances without departing from the technical spirit of downwardly compressing the tamping portion 40 using an elastic force. The compressing portion 50 according to an embodiment is a spring of which one side is in contact with the guide portion 20 and of which another side is in contact with the tamping portion 40.

The top of the compressing portion 50 using a coil spring is in contact with the bottom of the upper guide 22, and the bottom of the compressing portion 50 is in contact with the top of the tamping body 42. The tamping body 42 is compressed downward due to an elastic force of the compressing portion 50, and the head member 32 of the central connecting portion 30 coupled with the tamping body 42 is stopped by the top of the upper guide 22.

The porter filter 60 configured to contain the coffee grounds 70 includes the head portion 62 and a handle member 66. The edge member 64 provided on the head portion 62 configured to contain the coffee grounds 70 is in contact with the bottom of the extending body 18 of the tamper body 10, and the tamping portion 40 inserts into the head portion 62 and compresses the coffee grounds 70.

One side of the handle member 66 is connected to the head portion 62 and may be in various shapes including a bar shape easy for the user to grip.

Hereinafter, an operation state of the coffee tamper 1 according to an embodiment is further described with reference to the accompanying drawings.

Referring to FIG. 1, the completely assembled coffee tamper 1 is provided on the head portion 62. Referring to FIGS. 2 and 7, the coffee tamper 1 is moved downward such that the tamping body 42 inserts into the head portion 62.

If an operator downwardly moves the coffee tamper 1 in a state in which a movement of the porter filter 60 is confined, the tamping portion 40 elastically supported downward due to the elastic force of the compressing portion 50 evenly compresses the coffee grounds 70.

Referring to FIG. 7, the compressing portion 50 is compressed in response to continuous descending of the coffee tamper 1 and the head member 32 of the central connecting portion 30 is separated from the top of the upper guide 22.

In response to a descending operation of the tamper body 10, an operation of the tamping portion 40 evenly compressing the coffee grounds 70 filled in the head portion 62 continues. In a state in which the top of the tamping body 42 is in contact at a lower end of the lower guide 26, the tamper body 10 and the tamping portion 40 move downward together.

A compressing operation of the coffee tamper 1 is completed when the lower end of the extending body 18 of the tamper body 10 is in contact with the edge member 64 of the head portion 62.

Through an operation of the coffee tamper 1 compressing the coffee grounds 70, a leveling operation of the coffee grounds 70 filled in the head portion 62 is quickly and accurately performed. When an operation of filling the coffee grounds 70 in the head portion 62, that is, a dosing operation is performed before using the coffee tamper 1, a tamping level may vary based on an amount or a weight of the coffee grounds 70. However, the coffee tamper 1 according to the present disclosure is in a structure corresponding to a dosing operation of a user to easily adjust a height.

Also, the coffee tamper 1 according to an embodiment of the present disclosure compresses the coffee grounds 70 at the uniform pressure and thus, there may be no leveling error of the coffee grounds 70.

As described above, according to the present disclosure, compressing of the coffee grounds 70 filled in the porter filter 60 starts through the tamping portion 40 elastically compressed by the compressing portion 50 and compressing of the coffee grounds 70 ends when the tamper body is in contact with the edge member 64 provided on the head portion 62. Therefore, an operator may tamp the coffee grounds 70 filled in the porter filter 60 at the uniform pressure at all times.

Although the present disclosure is described with reference to the accompanying drawings and illustrated embodiments, it is provided as an example only and it will be apparent to those skilled in the art that various modifications and equivalent other embodiments may be made from the description. Therefore, the technical scope of the present disclosure should be defined by the claims and their equivalents.

1: coffee tamper 10: tamper body 12: body housing 14: connecting hole
16: inner groove portion 18: extending body 20: guide portion 22: upper guide
24: inner through-hole 26: lower guide 28: extending protrusion 30: central connecting portion
32: head member 34: moving member 40: tamping portion 42: tamping body
44: protruding body 50: compressing portion 60: porter filter 62: head portion
64: edge member 66: handle 70: coffee grounds

What is claimed is:
1. A coffee tamper comprising:
a tamper body including a connecting hole communicated in a vertical direction;

a guide portion provided in the tamper body and including an inner through-hole communicated to the connecting hole;

a central connecting portion of which one side is stopped by the guide portion and of which another side penetrates the inner through-hole and extends downward;

a tamping portion provided below the tamper body and configured to couple with the central connecting portion; and a compressing portion provided between the guide portion and the tamping portion and configured to downwardly compress the tamping portion.

2. The coffee tamper of claim 1, wherein the tamper body comprises:

a body housing including the connecting hole at the center and including an inner groove portion configured to stop the guide portion; and an extending body configured to extend from the body housing and to face the side of the tamping portion.

3. The coffee tamper of claim 2, wherein the guide portion comprises:

an upper guide configured to confine an upper movement of the body housing by being stopped by the inner groove portion and including the inner through-hole at the center; and a lower guide configured to extend downward from the upper guide and in which the central connecting portion and the compressing portion are provided.

4. The coffee tamper of claim 3, wherein the central connecting portion comprises:

a head member configured to be stopped by the upper guide; and a moving member configured to extend from the head member and extend along the inner side of the lower guide and to couple with the tamping portion.

5. The coffee tamper of claim 4, wherein the tamping portion comprises:

a tamping body configured to couple with the moving member, to vertically move with the moving member, and to compress coffee grounds filled in a porter filter; and a protruding body configured to extend upward from the tamping body and provided in the extending body.

6. The coffee tamper according to claim 1, wherein the compressing portion is a spring of which one side is in contact with the guide portion and of which another side is in contact with the tamping portion.

7. The coffee tamper according to claim 2, wherein the compressing portion is a spring of which one side is in contact with the guide portion and of which another side is in contact with the tamping portion.

8. The coffee tamper according to claim 3, wherein the compressing portion is a spring of which one side is in contact with the guide portion and of which another side is in contact with the tamping portion.

9. The coffee tamper according to claim 4, wherein the compressing portion is a spring of which one side is in contact with the guide portion and of which another side is in contact with the tamping portion.

10. The coffee tamper according to claim 5, wherein the compressing portion is a spring of which one side is in contact with the guide portion and of which another side is in contact with the tamping portion.

* * * * *